Patented Aug. 8, 1939

2,168,337

UNITED STATES PATENT OFFICE 2,168,337

CELLULOSIC STRUCTURE AND METHOD FOR PREPARING SAME

Winfield Walter Heckert, Ardentown, Del., assignor, by mesne assignments, to E. I. du Pont de Nemours & Company, Wilmington, Del., a corporation of Delaware No Drawing. Application June 17, 1936, Serial No. 85,817. In Germany June 18, 1935

24 Claims. (Cl. 8—55)

This invention relates to the manufacture of cellulosic materials such as cords, threads, yarns, filaments, fibers and films, pellicles, caps, bands and the like or fabrics made therefrom and the like which have improved affinity for acid dyestuffs.

Acid dyestuffs have, heretofore, been used almost exclusively for dyeing of wool, silk and other animal fibers, and, at least in certain cases, are considered superior to other dyes for this purpose.

Cellulosic materials and particularly cellulosic materials produced from artificial cellulosic compositions have little affinity for acid dyestuffs. Consequently when animal fibers such as wool and silk are mixed with cellulosic materials for the production of mixed yarns, threads or fabrics difficulty has been experienced in dyeing the composite yarns, threads or fabrics uniformly throughout.

It has now been found that when cellulosic materials, particularly regenerated cellulose and cellulose derivative materials, are treated with certain substances they will exhibit a considerable affinity for acid dyestuffs.

It is therefore an object of this invention to improve the affinity of cellulosic materials for acid dyestuffs.

It is another object of this invention to improve the affinity of cellulose derivative materials for acid dyestuffs.

It is another object of this invention to improve the affinity of regenerated cellulose materials for acid dyestuffs.

Other objects of the invention will appear hereinafter.

This invention is characterized by the incorporation of an amino polymer in the cellulosic material in any suitable manner. The amino polymers which are contemplated as coming within the scope of this invention are all substantially insoluble in water and in 5% aqueous ammonia, but soluble in 2% aqueous acetic acid. The amino nitrogen may be primary, secondary or tertiary, part of an open chain or of a cyclic molecular structure.

The amino polymers which may be introduced into cellulosic structures to improve their affinity for acid dyestuffs may be subdivided into several groups as follows.

1. The first group, closely related to though nevertheless distinct from cellulose, may be considered as hexose amine polymers, or more broadly as carbohydrate amine polymers which have, where necessary, been purified and converted into the acid soluble type. With or without such treatments, the highly polymeric molecule is built up by nature and the amino nitrogen, as a rule is present in the natural product. Those in which the nitrogen is present in the substance as it exists naturally may be of marine or insect origin on the one hand, or vegetable origin on the other. Deacetylated chitin, which is by far the best example of a hexose amine polymer is, for example, of marine origin, and the polymers obtained from fungi such as aspergillus niger are of vegetable origin. Examples of carbohydrate amine polymers in which the highly polymeric molecule has been built up by nature, but into which the amino nitrogen has been introduced synthetically are the alkylamino celluloses. Regardless of the source of the nitrogen, this first group also includes various reaction products and chemical derivatives of carbohydrate amine polymers, provided of course that they have the required solubility characteristics.

2. The second group of amino polymers comprises that group of synthetic resins, in the making of which ammonia in some instances and monomeric amino nitrogen containing bodies in others have been employed. This group is distinct in that the highly polymeric molecules are built up wholly by artificial means, i. e., they are not synthesized by nature. The resins of this group may be considered broadly as those which contain amino nitrogen and have the requisite solubility characteristics. The following types of resins are illustrative of the classes among which highly polymeric amino nitrogen containing bodies falling in this classification may be found. (a) Resinous polymeric amino alcohol esters of acrylic acid and of its homologues substituted in the alpha position by a hydrocarbon radical, and (b) resinous reaction products of phenols, aldehydes and ammonia or primary or secondary amines.

(a) Examples of the first of the above subclasses of resins are beta-diethylaminoethyl alpha-methacrylate, beta-piperidyl-N-ethyl-alpha-methacrylate, and beta-dicyclohexylaminoethyl alpha-methacrylate. These resins may be prepared by spontaneous polymerization of the monomeric compounds, but for the purposes of the present invention, advantage can be taken of a unique property of the monomers, namely their ability to form polymerizable salts with aqueous acids. The monomer as prepared may simply be dissolved in the stoichiometrical amount or more of aqueous acid and the solution heated with a polymerization catalyst such as benzoyl peroxide until polymerization of the salt is effected.

(b) An example of the second of the above subclasses of resins having amino nitrogen and the specified solubilities is the reaction product of meta-cresol, formaldehyde and dimethylamine. Other phenols such as phenol itself or p-tertiary amyl phenol may be substituted for the cresol, and the ammonia or various primary or secondary amines for the dimethylamine. It is desirable in most cases, possible in all cases, and necessary in some cases, to react the amine or ammonia with a part of the formaldehyde before adding the remainder. These resins are to be sharply distinguished from the phenol-aldehyde resins prepared in the presence of only catalytic amounts of ammonia or amines, which resins cannot be employed in accordance with the methods of this invention because they lack the preponderance of amino nitrogen which induces the proper solubility characteristics. The molal ratio of amine to phenol which is used in making the resins with which the present invention is concerned is on the order of 1:2.

3. The third group of amino nitrogen containing polymers included in this invention consists of protein derivatives containing sufficient amino nitrogen to make them comply with our solubility requirements. Examples are piperidylmethyl zein, dimethylaminomethyl zein, and diethylaminomethyl zein. These products may be made in one way as follows. The zein is first suspended in water or dissolved in about 75% alcohol, preferably the latter. To the alcohol solution is added aqueous formaldehyde, a secondary amine and sufficient alcohol to keep the concentration at about the original figure. The mixture is allowed to stand or may be heated gently until it becomes soluble in acetic acid, 6–18 hours, depending on temperature, usually being required. The final product, in order to be acid soluble, should have at least 8–10% basic amino nitrogen. The maximum obtainable is around 22% and the products having the high percentages are the most desirable for use in the present invention.

An example of a particularly suitable hexose amine polymer is substantially undegraded, at least partially deacetylated chitin. Chitin is the essential constituent of horny exoskeletons of crabs, lobsters, shrimp and other crustacea, as well as of certain insects such as locusts, grasshoppers and the like. Certain vegetable sources are also available, as for instance fungi such as aspergillus niger.

Chitin is thought to consist of acetylated amino cellulose and in order to render it soluble in dilute acetic acid, it has to be treated so as to remove at least some of the acetyl groups. In order that the treated chitin may be capable of being converted into a useful product, the deacetylation should be sufficiently mild so that the polymeric chitosamine molecule be not substantially degraded.

Preferably from 0.2 to 0.9, and particularly from 0.7 to 0.86 of the nitrogen in the deacetylated chitin employed is in the form of free amino groups.

Suitable deacetylated chitin may be prepared by digesting purified chitin with alkali under conditions which preclude substantial degradation. The extent to which chitin may thus be acetylated is governed by the concentration of the caustic alkali, the temperature and time of treatment, the particle size, density and previous treatment of the chitin. Caustic alkali concentrations of from 5% to 60% by weight may be used, the time and temperature of the reaction being adjusted in accord with the caustic alkali concentration used. The higher the concentration the lower should be the temperature and/or the shorter the time of treatment. With 5% caustic soda at 150° C. about 24 hours are required to reach a soluble stage; with 50% caustic soda at 100° C. only 1 hour's treatment is necessary, while with 40% caustic soda at 100° C. about 18 hours are required to reach the same degree of deacetylation.

The viscosity of solutions of deacetylated chitin in aqueous acetic acid is also a measure of the extent of degradation during the deacetylation treatment. Generally speaking, it is desirable that the process be controlled in such a way that the viscosity of a 5% solution of the product in aqueous acetic acid of the necessary concentration shall not be less than one poise. The viscosities of such solutions of deacetylated chitin obtained by treating chitin at a temperature of 100° C. for various periods of time with 50.9% sodium hydroxide are given in the following table:

| Time of treatment | Viscosity |
| --- | --- |
|  | Poises |
| 1 hour | 630 |
| 2½ hours | 63 |
| 6 hours | 46 |
| 16 hours | 36 |
| 48 hours | 11 |

The viscosity of solutions of deacetylated chitin of given concentration in the equivalent or a given excess of acetic acid may be decreased by the addition to the solution of oxidizing agents such as hydrogen peroxide, chlorine, bromine, hypochlorous acid, perborates, permanganates, bichromates, oxygen, air, etc. Thus, the addition of 20 parts per million of 30% hydrogen peroxide reduces the viscosity from 568 to 213 poises in one hour, or from 510 to 80 poises in three hours, but no further drop in viscosity is observed after three weeks. The viscosity may also be altered by allowing one of the above described oxidizing agents to act upon the solid material, i. e., prior to dissolving in acetic acid.

The viscosity of the material, when dissolved in acetic acid, may be increased by heating the solid material before dissolution. Thus, on heating one batch of deacetylated chitin in the solid state for 12 hours at 100° C., the viscosity of a 5% solution in aqueous acetic acid was raised from 5 to 100 poises.

EXAMPLE A

Crude chitin (e. g., crab shells) was first puriged by alternate treatment with 1% soda ash at boiling temperature and with 5% hydrochloric acid at ordinary temperature until the material was free from lime salts and adherent protein. The pure chitin thereby obtained was then digested with 40% sodium hydroxide at 110° C. for about 4 hours under conditions which substantially exclude oxidation. The deacetylated chitin thus produced was soluble in aqueous acetic acid, for example, in the proportion of 161 grams of deacetylated chitin to 48 grams of acetic acid, dissolved in the amount of water required to give the desired viscosity.

Since deacetylated chitin is essentially a substance which, although highly polymeric, contains a large percentage of its nitrogen in the form of primary amino groups, it would be expected to form salts with acids, and this presumably is what occurs when acids are employed for conversion of the product to the form in which it is to be used in making the coating compositions of the present invention. Evidence for salt formation is that the product requires the stoichiometrical amount of acetic acid, for example, before complete solution takes place. While reference will be made hereinafter to these solutions in acid as acid solutions of the polymeric amino nitrogen containing body or as solutions of the acetate, propionate, etc., depending on the acid employed, it is not desired to be confined in the appended claims to a theory of salt formation. Most of the "salts" described herein (which may if desired by prepared with more than a stoichiometrical amount of acid and thus may contain an excess thereof) are water soluble. Thus, the acetate, benzoate, formate, lactate, maleate, adipate, citrate, glutamate, isobutyrate, and under certain circumstances the hydrochloride of deacetylated chitin are readily soluble; the succinate, phthalate, and hypochlorite are, however, only slightly soluble; others such as the oxalate, salicylate, and linoleate, are even less soluble; and the sulfate is relatively insoluble.

One method of altering the solubility of deacetylated chitin so that it can be dissolved in aqueous cellulosic solutions such as viscose and thus be uniformly incorporated in the regenerated cellulose product is described in copending application Serial No. 5,823, filed June 17, 1936, to J. F. Haskins. Briefly, this process comprises taking deacetylated chitin, dissolving it in dilute acetic acid and then thoroughly dispersing this solution in an aqueous solution of caustic soda of from 2-50% concentration. A precipitated deacetylated chitin in gelatinous form results, which precipitate is pressed as free from caustic solution as is possible and then mixed with carbon disulfide at room temperature for a period of several hours until a test portion is found to be soluble in water. The product, without additional purification, can then be easily dissolved in ordinary viscose.

The preparation of other amino polymers is fully discussed in a number of copending applications such as for instance Rigby U. S. Patent No. 2,040,879, relating to the preparation of deacetylated chitin; Graves application Serial No. 21,807, filed May 16, 1935, relating to polymeric amino alcohol esters of alpha substituted acrylic acid; Harmon application Serial No. 21,810, filed May 16, 1935, relating to polymeric salts of amino alcoholic esters of alpha substituted acrylic acid; Meigs application Serial No. 59,643, filed January 17, 1936, relating to amino proteins; Hardy U. S. Patent No. 2,136,296, relating to amino celluloses soluble in dilute acetic acid; Haskins U. S. Patent No. 2,136,299, relating to alkyl amino celluloses soluble in at least a stoichiometrical amount of 5% aqueous acetic acid; Balthis U. S. Patent No. 2,122,707, relating to the resin prepared by reacting vinyl ketone polymers such as methyl vinyl ketone with ammonia or a primary amine; and Greenewalt U. S. Patent No. 2,063,158, relating to hydrogenating ketone resins in the presence of ammonia or a primary or secondary amine. Reference is also made to the U. S. Patent No. 2,098,869 of Harmon and Meigs relating to amine phenol formaldehyde resins.

To further illustrate the preparation of a few of these amino resins the following examples are given.

EXAMPLE B.—*Beta-diethylaminoethyl methacrylate*

This compound is made by dissolving 117 grams (1 mol) of beta-diethylaminoethanol and 400 grams (4 mols) of methyl methacrylate in 300 grams of dry benzene containing 30 grams p-phenylene diamine, and heated in an oil bath under a 48" fractionating column fitted with a distilling head arranged for controlled reflux and distilled until all the moisture present in the reagent has been removed. Beta-diethylaminoethyl methacrylate is isolated by collecting the fraction boiling at 85±5° C. at 5 mm. pressure, carefully washing 8 times with cold water to remove traces of p-phenylene diamine, drying with anhydrous magnesium sulfate, filtering, washing the drying agent with ether, combining the washings with the bulk of the product and then distilling the ether under reduced pressure in an atmosphere of nitrogen. The monomeric ester is left in the distilling glass as an almost colorless liquid which polymerizes spontaneously to a tough, transparent, pale amber polymer. When allowed to stand at room temperature or even at a lower temperature, the polymer was insoluble in water and in the common oxygenated organic solvents, soluble in acetone.

EXAMPLE C

To a solution of 220 ccs. of formalin (37% aqueous formaldehyde) containing 1 gram of potassium carbonate, there is added 250 ccs. piperidene while the mixture is cooled with tap water. This methylolpiperidene solution is then added to a mixture of 1,500 ccs. of methanol, 75 ccs. of water, and 250 grams of zein. The solution was mixed thoroughly with mechanical agitation and allowed to stand overnight. It was centrifuged to remove insoluble materials and then concentrated in vacuo. The concentrated solution is poured into a large volume of water which results in the precipitation of the reaction product, which is washed several times by decantation and then finally pressed out and dried as rapidly as possible through the aid of a hot air blast in an oven at 50° C. The material is ground to a fine powder as soon as it is dry, the yield of piperidyl methyl zein being 239 grams. This material is readily soluble in dilute aqueous acetic acid, but insoluble in water or dilute ammonia solutions.

EXAMPLE D

Fifty grams of polymeric methyl vinyl ketone are dissolved in 250 grams of dioxan and agitated overnight with 50 grams of cyclohexylamine. A test showed that the resin was not readily soluble in dilute acids; hence, the reaction mixture was heated in a steam bath for 5 hours. The resin was then precipitated. By pouring the reaction mixture in water and after standing 12 hours in fresh water, it was filtered and dried in vacuo. The yield was 55 grams. The pulverized resin was soluble to the extent of 4 grams in 96 grams of 5% aqueous solution of acetic acid.

EXAMPLE E

A solution of 18 grams (0.4 mol) of dimethylamine in 32.4 grams (0.4 mol) of 37% aqueous formaldehyde was added with mechanical stirring and cooling to 53.5 grams (0.5 mol) of 88% phenol. To the above mixture, a solution of 81 grams (1 mol) of 37% aqueous formaldehyde and 30.4 grams (0.5 mol) of 28% aqueous ammonia was added with cooling. The resulting solution was gradually heated in a water bath to 90° C. and held at that temperature for 5 hours. The resulting resin was purified by grinding it to a uniform slurry in the presence of a little water in an ice cold mortar, followed by filtration and washing with ice cold water. After drying, it weighed 74 grams. It was a yellow material which softened slightly above room temperature. It was soluble in acetone, ethyl acetate, dioxan, 10% aqueous sodium hydroxide, 1.5% aqueous acetic acid, 3% formic acid, and 90% toluene 10% ethanol mixture.

There are of course numerous other amino polymers that can be prepared in much the same way as will be apparent from a study of the applications specifically referred to above, such as for instance beta-dimethylamino-methyl methacrylate; beta-dicyclohexylaminoethyl methacrylate; beta-di-N-butylaminoethyl methacylate; beta-morpholine-N-ethyl methacrylate; piperidyl amino ethyl methacrylate; triethanolamine monomethacrylate; di-methylaminoethyl zein; diethylaminoethyl zein; dibutylaminoethyl zein; piperidyl methyl glycinin; dimethylaminoethyl gliadin; dimethylaminomethyl casein; the polymerization product resulting by reacting polymeric methyl vinyl ketone with concentrated ammonium hydroxide or with amines such as cyclohexylamine, glucamine, ethanolamine, ethylene diamine; the reaction product between phenol, formaldehyde, ammonia and dimethylamine; between phenol, lignin, formaldehyde and dimethylamine; between phenol, formaldehyde and dimethylaminoethanol; between phenol, formaldehyde and dimethyl cyclohexanolamine; between phenol, formaldehyde, ammonia and aniline; and many others.

Instead of simple polymers, interpolymers may be prepared for instance by reacting methyl methacrylate and methyl vinyl ketone in the presence of ammonium hydroxide or reacting beta-cyclohexylaminoethyl methacrylate monomer and beta-dimethylaminoethyl methacrylate monomer together under suitable condition. Other equivalent polymeric materials such as copolymers may also be used, provided their solubility characteristics are as previously set forth.

In carrying out the instant invention these polymers are incorporated in the cellulosic textile material in any suitable manner, as for instance by dissolving or dispersing the polymer in the cellulosic spinning solution or by dissolving or dispersing the polymer in a suitable solvent or dispersing agent, impregnating the textile material with this solution or dispersion and removing the solvent or dispersing agent.

The following examples are given to illustrate the principles of this invention, it being understood of course that the invention is not limited to these precise examples which are merely illustrative of the invention.

EXAMPLE I

Deacetylated chitin prepared according to Example A is dissolved in a 5% acetic acid to form a solution containing 3% deacetylated chitin and this solution heated to 50° C. A small skein of cellulose acetate yarn is soaked in this solution for 5 minutes, then removed, the excess solution drained therefrom and the yarn placed in 5% ammonium hydroxide at room temperature for 5 minutes and then dried at room temperature. The yarn so treated, when dyed in the manner described immediately below, is uniformly colored to a full shade. If desired, the deacylated chitin containing yarn may be dried before treatment with ammonia.

Milling Red R Conc. (color index 430), (see 1932 year book of American Association of Textile Colorists & Chemists) is dissolved in water to form a dye solution containing 0.2% dye. Twenty-five ccs. of this dye solution, 0.5 gram of sodium sulfate, and 0.25 gram of acetic acid are dissolved in 175 ccs. of water. The solution is heated to 40° C. and a 5 gram sample of yarn introduced, whereupon the solution is heated to boiling and boiled for ½ hour and then 0.5 cc. of 15% acetic acid is dissolved in the dye bath and the boiling continued for another ½ hour. The sample is then removed from the bath, rinsed in water and dried.

EXAMPLE II

One hundred forty parts of a 5% solution in 2% acetic acid of deacetylated chitin obtained from shrimp shells was poured slowly into 200 parts of a 27% aqueous solution of sodium hydroxide with vigorous agitation. The precipitated deacetylated chitin was pressed as dry as possible, after which it weighed 140 parts.

Seven hundred parts of air dried cotton linters were steeped in a 19% aqueous solution of sodium hydroxide and then pressed to 1,900 parts. Three hundred twenty parts of this alkali cellulose were shredded with the deacetylated chitin-alkali mixture for 2 hours and the shredded mass then added to the remainder of the alkali cellulose and the two shredded together for 2 more hours. The material, after aging 24 hours at 25° C., was xanthated with 35% carbon disulfide (based on the weight of the cellulose) dissolved in sufficient dilute aqueous sodium hydroxide solution to form a viscous solution containing 6.93% cellulose, 0.07% deacetylated chitin and 6% sodium hydroxide. The solution, after thoroughly mixing, filtering and ripening for 60 hours at 18° C. was spun through a spinneret into an aqueous bath containing 10% sulfuric acid, 18% sodium sulfate and 3% glucose. The yarn was washed with water, using a short ammonia wash to insure the neutralization of any trace of acid, was desulfured and bleached in the usual manner and then dried. The physical properties of the yarn were good and the yarn showed high affinity for acid dyestuffs. The finished yarn contained about 1% deacetylated chitin.

EXAMPLE III

The beta-diethylaminoethyl methacrylate prepared according to Example B is dissolved in acetone and to this solution sufficient cellulose acetate is added to form a spinning solution containing 20% cellulose acetate, 4% polymer and 76% acetone. The solution is electrically spun, for example, in the manner disclosed in the U. S. Patent to Formhals No. 1,975,504, and the yarn so produced dyed in the same manner as described under Example I, using either Milling Red R Conc. or Brilliant Milling Green B. Conc. (color index 667.) The yarn so produced has good physical properties and shows high affinity for acid dyestuffs according to the test described at the end of Example I.

EXAMPLE IV

The polymer produced according to Example C is dissolved in 4% acetic acid to form a solution containing 4% of the polymer. The solution is heated to 50° C. and a small bunch of cellulose acetate staple fibers is soaked in this solution for 5 minutes, then removed, the excess solution drained therefrom and the yarn placed in a 5% ammonium hydroxide water solution, at room temperature for 5 minutes, rinsed and dried at room temperature. The fibers so treated are tested in the manner described under Example I and were found to have taken the acid dye exceedingly well.

EXAMPLE V

The diethylaminomethacrylate produced according to the procedure outlined in Example B is dissolved in 6% acetic acid to form a solution containing 3% of the resin. After heating the solution to 50° C., a small piece of regenerated cellulose fabric is immersed in a solution and left there for 5 minutes. Then the fabric is removed, the excess solution drained therefrom and placed in a 5% ammonium hydroxide solution at room temperature for 5 minutes, after which it is rinsed and dried at 50° C. The fabric so treated showed a decided improvement in affinity for acid dyes when tested in the manner described after Example I.

EXAMPLE VI

The polymer prepared according to Example C is dissolved in a 5% acetic acid solution to form a solution containing 5% resin. The solution is heated to 60° C. A small bunch of staple rayon fibers is immersed in the solution and allowed to remain there for 5 minutes. The fibers are then removed, the excess solution drained from them, after which they are immersed in a 5% ammonium hydroxide water solution at room temperature for about 5 minutes, again rinsed, and dried at room temperature. The fibers so treated, when tested in the manner described under Example I, showed a marked affinity for acid dyestuffs.

EXAMPLE VII

The resin prepared according to Example E was dissolved in a cellulose acetate spinning solution to the extent of 10%, based on the cellulose acetate present. The cellulose acetate solution prior to the addition of the resin comprises 15% cellulose acetate in a solvent composed of 97% acetone and 3% water. The spinning solution containing the resin dissolved therein was dry spun in the usual manner. A skein of this yarn, when dyed in the manner described under Example I, showed a decided affinity for acid dyes and was comparable in uniformity and depth of color to wool yarn dyed in the same manner.

EXAMPLE VIII

The resinous polymer prepared according to Example D above was dissolved in 5% acetic acid to the extent of 2% resin. The solution was heated to 60° C. and a small piece of cellulose acetate fabric immersed in a solution where it was allowed to remain for about 5 minutes. The fabric was removed, the excess solution drained therefrom and then placed in a 5% ammonium hydroxide water bath at room temperature for 5 minutes. At the end of this time the sample was removed, rinsed with water and dried at 40° C. The fabric so treated showed a remarkable improvement in affinity for acid dyestuffs as compared with cellulose acetate which had not been treated.

EXAMPLE IX

An interpolymer prepared by the interaction and condensation of 65% dicyclohexyl amino ethyl methacrylate monomer and 35% dimethyl amino ethyl methacrylate monomer is incorporated in a cellulose acetate spinning solution of the following composition:

| | Parts by weight |
|---|---|
| Cellulose acetate | 15 |
| Ethylene dichloride | 70 |
| Isopropyl alcohol | 30 |
| The interpolymer | 3 |

The solution is spun electrically in the manner described in U. S. Patent No. 1,975,504. The fibers so produced when dyed in the manner described under Example I showed good affinity for acid dyestuffs.

It will be apparent from the foregoing examples that these polymeric amino nitrogen containing bodies may be incorporated in the cellulosic textile material in many ways. If the resin is incorporated in the solution from which the cellulosic material is spun, it is generally desirable to add a higher concentration of resin to the solution, based on the cellulose content, than is added to the bath in which textile materials are after-treated.

If the material is to be added to the spinning solution, concentrations as high as 30% or even more, based on the weight of the cellulosic material present may be used. In general, however, I find that concentrations ranging from 2 or 3% up to about 20%, depending of course on the effectiveness of the specific materials chosen, are sufficient for most purposes. While it is possible to increase the depth of dyeing by the addition of still larger quantities of the polymer, the increased depth of dyeing is offset by weakening of the cellulosic structure, so that from the practical standpoint, it is advisable to use no more resin in the thread than is necessary to obtain the depth of color desired.

If desired, the dye may be dissolved in the treating bath containing the amine polymer, the monomer or the polymer forming materials, and the cellulosic structure treated in a single bath. Furthermore, the dye may be incorporated in the cellulosic solution from which the cellulosic structure is formed along with the amine polymer or the like, and colored structures formed therefrom.

Where the resin is to be added to the thread by after-treatment, concentrations of resins in the solution which is impregnated in the cellulosic structure need be no more than about 10%. Very good results have been secured with as little as 1% and generally, it is not necessary to increase the concentration over 5 or 6%.

It is preferred of course to select a resin which will be soluble in a suitable solvent according to the process to be used. For instance, if the material is to be incorporated in a cellulose acetate spinning solution, a resin should be selected which is soluble in acetone, acetone-alcohol mixtures, or other suitable solvent or solvent mixture for the cellulose acetate. In some cases, it may be possible to use resins which are dispersed rather than dissolved in the spinning solution.

As we have previously pointed out, deacetylated chitin may be used in viscose solutions by reacting it with caustic soda and carbon disulfide to form a caustic solution product, but which product may subsequently be regenerated to form, uniformly distributed throughout the cellulosic thread, deacetylated chitin. It is, of course, to be understood that any other amino polymers included within the scope of this invention which can by suitable treatment be modified so as to dissolve them in viscose may be used in the same way so long as the material is subsequently reconverted at some step in the process in the formation of the cellulosic thread from the solution into an amino polymer which is insoluble in water and 5% aqueous ammonia, but soluble in 2% aqueous acetic acid.

In some instances it may be desirable to incorporate the resin forming materials in the yarn and to form the resin in situ. This is a desirable procedure, especially where the resin to be used is insoluble in a suitable solvent but where the resin forming materials or the monomer are soluble in a suitable solvent. Furthermore, improved results can frequently be secured by impregnation of the gel regenerated cellulose structure, i. e., a regenerated cellulose structure that has never been dried below 20% moisture content, with the resin forming materials or the monomer, and thereafter subjecting the structure to a sufficiently elevated temperature to cause polymerization to take place.

The term "cellulosic" as used heretofore is intended to cover all kinds of cellulosic threads, such as cotton and linen, and more particularly cellulosic fibers, threads or the like produced from solutions of cellulosic compounds, such as from viscose and cuprammonium cellulosic solutions, cellulose acetate and other cellulose esters, as cellulose propionate, cellulose butyrate, etc. and cellulose ethers, such as benzyl cellulose, ethyl cellulose, methyl cellulose and other cellulose derivatives. The cellulose derivative may contain a relatively large portion of ester or ether groups, such as cellulose triacetate or cellulose diacetate, or may contain a relatively small amount such as is contained in lowly etherified or lowly esterified compounds, such as glycol cellulose.

The dyes which have been disclosed hereinfore are merely illustrative of that class of dyes known as acid dyestuffs and any other dyes generally classified as acid dyes may be substituted with substantially equivalent results.

It is apparent that this invention considerably widens the range of dyestuffs available for use with cellulose acetate and/or regenerated cellulose threads or fibers. It enables the dyer to use new classes of dyes which can be easily applied, which are relatively cheap and which will produce uniform colors fast to light, washing, and other factors tending to affect the color. Furthermore, since these resins are of high molecular weight, they are slow to diffuse from the fiber and since they are generally of film forming materials, they do not tend to weaken the fiber, to the extent the fibers would be weakened by incorporating therein low molecular weight substances such as monomers. Also, these materials have a further advantage for this use in that they are definitely not volatile and water insoluble and therefore resist removal by heat or washing.

By means of this invention regenerated cellulose may be mixed with wool or cellulose acetate and dyed satisfactorily with acid dyestuffs. Furthermore, fabrics made from 100% cellulose acetate are simply and inexpensively dyed. It is also possible by means of this invention to mix cellulose acetate materials with wool and secure satisfactory dye results with acid colors.

While this invention has been described in connection with threads, textile fabrics, etc., it is also useful in connection with other types of structures. For instance, film, sheeting or the like of cellulose acetate which contains a small amount of any of the polymers discussed may be readily dyed with acid dyestuffs.

Parts and proportions of materials as set forth in the specification and claims refer to parts and proportions by weight unless otherwise specified.

Since it is obvious that many changes and modifications of the above described process and products can be made without departing from the nature and spirit of the invention it is to be understood that the invention is not to be limited except as set forth in the appended claims.

I claim:

1. The process which comprises dyeing with an acid dyestuff, a cellulosic structure containing an amine polymer which is insoluble in water and in 5% aqueous ammonia and soluble in 2% aqueous acetic acid, said polymer having the property of increasing the affinity of said structure for said acid dyestuff.

2. The process which comprises dyeing with an acid dyestuff, an organic cellulose derivative structure containing an amine polymer which is insoluble in water and in 5% aqueous ammonia and soluble in 2% aqueous acetic acid, said polymer having the property of increasing the affinity of said structure for said acid dyestuff.

3. The process which comprises dyeing with an acid dyestuff, a regenerated cellulose structure containing an amine polymer which is insoluble in water and in 5% aqueous ammonia and soluble in 2% aqueous acetic acid, said polymer having the property of increasing the affinity of said structure for said acid dyestuff.

4. The process which comprises dyeing with an acid dyestuff, a cellulosic structure containing deacetylated chitin.

5. The process which comprises dyeing with an acid dyestuff, an organic cellulose derivative structure containing deacetylated chitin.

6. The process which comprises dyeing with an acid dyestuff, a regenerated cellulose structure containing deacetylated chitin.

7. The process which comprises dyeing with an acid dyestuff, a cellulosic structure containing a resinous polymeric amino nitrogen containing body which is insoluble in water and in 5% aqueous ammonia and soluble in 2% aqueous acetic acid said body having the property of increasing the affinity of said structure for said acid dyestuff.

8. The process which comprises dyeing with an acid dyestuff, an organic cellulose derivative structure containing a resinous polymeric amino nitrogen containing body which is insoluble in water and in 5% aqueous ammonia and soluble in 2% aqueous acetic acid said body having the property of increasing the affinity of said structure for said acid dyestuff.

9. The process which comprises dyeing with an acid dyestuff, a regenerated cellulose structure containing a resinous polymeric amino nitrogen containing body which is insoluble in water and in 5% aqueous ammonia and soluble in 2% aqueous acetic acid said body having the property of increasing the affinity of said structure for said acid dyestuff.

10. The process which comprises dyeing with an acid dyestuff, a cellulosic structure containing a resinous polymeric amine derivative of protein which is insoluble in water and in 5% aqueous ammonia and soluble in 2% aqueous acetic acid, said derivative of protein having the property of increasing the affinity of said structure for said acid dyestuff.

11. The process which comprises dyeing with an acid dyestuff, an organic cellulose derivative structure containing a resinous polymeric amine derivative of protein which is insoluble in water and in 5% aqueous ammonia and soluble in 2% aqueous acetic acid, said derivative of protein having the property of increasing the affinity of said structure for said acid dyestuff.

12. The process which comprises dyeing with an acid dyestuff, a regenerated cellulose structure containing a resinous polymeric amine derivative of protein which is insoluble in water and in 5% aqueous ammonia and soluble in 2% aqueous acetic acid, said derivative of protein having the property of increasing the affinity of said structure for said acid dyestuff.

13. A cellulosic structure containing an amine polymer which is insoluble in water and in 5% aqueous ammonia and soluble in 2% aqueous acetic acid, and an acid dyestuff, said polymer having the property of increasing the affinity of said structure for said acid dyestuff.

14. An organic cellulose derivative structure containing an amine polymer which is insoluble in water and in 5% aqueous ammonia and soluble in 2% aqueous acetic acid, and an acid dyestuff, said polymer having the property of increasing the affinity of said structure for said acid dyestuff.

15. A regenerated cellulose structure containing an amine polymer which is insoluble in water and in 5% aqueous ammonia and soluble in 2% aqueous acetic acid, and an acid dyestuff, said polymer having the property of increasing the affinity of said structure for said acid dyestuff.

16. A cellulosic structure containing deacetylated chitin and an acid dyestuff.

17. An organic cellulose derivative structure containing deacetylated chitin, and an acid dyestuff.

18. A regenerated cellulose structure containing deacetylated chitin, and an acid dyestuff.

19. A cellulosic structure containing a resinous polymeric amino nitrogen containing body which is insoluble in water and in 5% aqueous ammonia and soluble in 2% aqueous acetic acid, and an acid dyestuff said body having the property of increasing the affinity of said structure for said acid dyestuff.

20. An organic cellulose derivative structure containing a resinous polymeric amino nitrogen containing body which is insoluble in water and in 5% aqueous ammonia and soluble in 2% aqueous acetic acid, and an acid dyestuff said body having the property of increasing the affinity of said structure for said acid dyestuff.

21. A regenerated cellulose structure containing a resinous polymeric amino nitrogen containing body which is insoluble in water and in 5% aqueous ammonia and soluble in 2% aqueous acetic acid, and an acid dyestuff said body having the property of increasing the affinity of said structure for said acid dyestuff.

22. A cellulosic structure containing a resinous polymeric amine derivative of protein which is insoluble in water and in 5% aqueous ammonia and soluble in 2% aqueous acetic acid, and an acid dyestuff said derivative of protein having the property of increasing the affinity of said structure for said acid dyestuff.

23. An organic cellulose derivative structure containing a resinous polymeric amine derivative of protein which is insoluble in water and in 5% aqueous ammonia and soluble in 2% aqueous acetic acid, and an acid dyestuff said derivative of protein having the property of increasing the affinity of said structure for said acid dyestuff.

24. A regenerated cellulose structure containing a resinous polymeric amine derivative of protein which is insoluble in water and in 5% aqueous ammonia and soluble in 2% aqueous acetic acid, and an acid dyestuff said derivative of protein having the property of increasing the affinity of said structure for said acid dyestuff.

WINFIELD WALTER HECKERT.

CERTIFICATE OF CORRECTION.

Patent No. 2,168,337.  August 8, 1939.

WINFIELD WALTER HECKERT.

It is hereby certified that error appears in the printed specification of the above numbered patent requiring correction as follows: Page 3, first column, line 32, for "Serial No. 5,823" read Serial No. 85,823; page 4, first column, lines 22 and 23, for "di-methylaminoethyl zein; diethylaminoethyl zein; dibutylaminoethyl" read di-methylaminomethyl zein; diethylaminomethyl zein; dibutylaminomethyl; lines 34 and 35, for "dimethylaminoethanol; between phenol, formaldehyde and dimethyl" read dimethylaminomethanol; between phenol, formaldehyde and dimethylol; and second column, line 38, for "viscous" read viscose; page 5, second column, line 70, for "solution" read soluble; page 6, first column, line 41-42, for "hereinfore" read hereinbefore; and second column, line 9, for "process" read processes; and that the said Letters Patent should be read with this correction therein that the same may conform to the record of the case in the Patent Office.

Signed and sealed this 26th day of September, A. D. 1939.

(Seal)

Henry Van Arsdale,
Acting Commissioner of Patents.